United States Patent
Tanaka et al.

(10) Patent No.: US 12,109,875 B2
(45) Date of Patent: Oct. 8, 2024

(54) ELECTRIC VEHICLE POWERTRAIN ARRANGEMENT

(71) Applicant: Nissan Motor Co., Ltd., Yokohama (JP)

(72) Inventors: Hiroaki Tanaka, Kanagawa (JP); Yoshinori Sugahara, Kanagawa (JP); Yusuke Tanno, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 18/565,109

(22) PCT Filed: Jun. 30, 2021

(86) PCT No.: PCT/JP2021/024873
§ 371 (c)(1),
(2) Date: Nov. 29, 2023

(87) PCT Pub. No.: WO2023/276087
PCT Pub. Date: Jan. 5, 2023

(65) Prior Publication Data
US 2024/0262176 A1    Aug. 8, 2024

(51) Int. Cl.
*B60K 1/00* (2006.01)
*B60K 17/04* (2006.01)
*B60T 7/04* (2006.01)
*B60T 11/18* (2006.01)
*B62D 25/14* (2006.01)

(52) U.S. Cl.
CPC .............. *B60K 1/00* (2013.01); *B60K 17/04* (2013.01); *B60T 7/04* (2013.01); *B60T 11/18* (2013.01); *B62D 25/14* (2013.01)

(58) Field of Classification Search
CPC .......... B60K 1/00; B60K 17/04; B60T 11/18; B62D 25/14
See application file for complete search history.

(56) References Cited

U.S. PATENT DOCUMENTS 8,770,326 B2 * 7/2014 Matano ................ B60K 1/00
180/65.1
2020/0262409 A1 * 8/2020 Takahashi ............ B60T 13/745

FOREIGN PATENT DOCUMENTS

CN    109421805 A    3/2019
CN    112477995 A    3/2021
(Continued)

OTHER PUBLICATIONS

Chinese Office Action of Apr. 28, 2024 of corresponding Chinese Patent Application No. 202180099608.2.

*Primary Examiner* — Jason D Shanske
*Assistant Examiner* — James J Triggs
(74) *Attorney, Agent, or Firm* — Global IP Counselors, LLP (57) ABSTRACT

An electric vehicle includes a dash panel, a master cylinder and an electrical unit. The master cylinder is arranged on a motor compartment side and the driver's seat side of the dash panel. The master cylinder is connected to a brake pedal in a vehicle passenger compartment. The electrical unit includes an inverter, a motor and a gearbox. The electrical unit is arranged side by side in the motor compartment in a left-right direction of the vehicle. The electrical unit is disposed in front of and below the master cylinder in the motor compartment in a front-rear direction of the vehicle.

7 Claims, 8 Drawing Sheets

(56) References Cited

FOREIGN PATENT DOCUMENTS

| | | |
|---|---|---|
| JP | H10-329701 A | 12/1998 |
| JP | 2005-280539 A | 10/2005 |
| JP | 2011-84198 A | 4/2011 |
| JP | 2012-153229 A | 8/2012 |
| JP | 2016-199142 A | 12/2016 |
| JP | 2019-38333 A | 3/2019 |
| JP | 6606995 B2 | 11/2019 |

* cited by examiner

ELECTRIC VEHICLE POWERTRAIN ARRANGEMENT

CROSS-REFERENCE TO RELATED APPLICATIONS

This application is a U.S. national stage application of International Application No. PCT/JP2021/024873, filed on Jun. 30, 2021.

BACKGROUND

Technical Field

The present invention relates to an electric vehicle.

Background Information

JP6606995B discloses a structure for suppressing the deformation of a vehicle equipped with a protective member fixed to a dash panel and containing the brake system components In this vehicle deformation suppressing structure, when a heavy component comes into contact with a guide surface of the protective member at the time of a vehicle collision, as the heavy component retreats, the protective member is displaced toward the upward direction of the vehicle with a fixed portion as a fulcrum. Therefore, the amount of retraction of the dash panel is reduced, and deformation of the dash panel into the interior space of the vehicle passenger compartment by the brake system components can be suppressed while protecting the brake system components.

SUMMARY

In small-sized vehicles such as small vehicles the space in the motor compartment is narrow in both the longitudinal and lateral directions. In such small-sized electric vehicles, the inverter, motor, and gearbox that make up the electrical unit are sometimes arranged side by side in the motor compartment in the left-right direction of the vehicle.

However, since the space within the motor compartment is intrinsically narrow, the distance between the electrical unit arranged in this manner and the dash panel is small. Therefore, if, at the time of a vehicle collision, the electrical unit interferes with the master cylinder or the dash panel in the area in front of an occupant, the master cylinder or the dash panel in the area in front of the occupant may move backward significantly toward the rear of the vehicle, potentially affecting the occupants.

In view of the problem described above, an object of the present invention is to increase the safety of the occupants in the event of a vehicle collision.

In an electric vehicle according to one aspect of the present invention, an electrical unit, in which an inverter, a motor, and a gearbox are arranged side by side in the motor compartment in the left-right direction of the vehicle, is disposed either in front of and below the master cylinder in the front-rear direction of the vehicle, or below the master cylinder so as to partially overlap the master cylinder in the front-rear direction.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the appended drawings.

Figure 1:
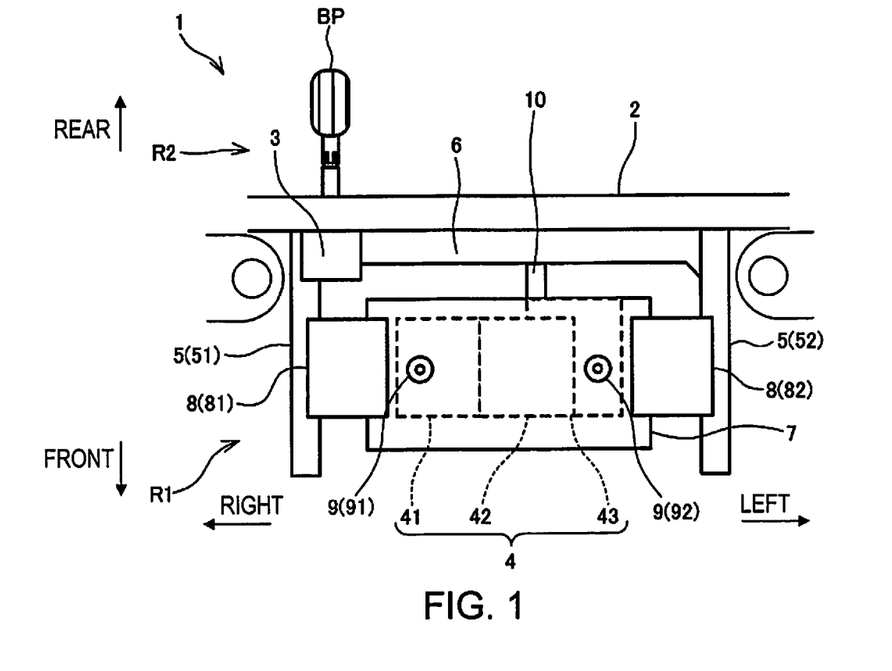
FIG. 1 is a diagram of the motor compartment interior of an electric vehicle as seen from above.
Figure 2:
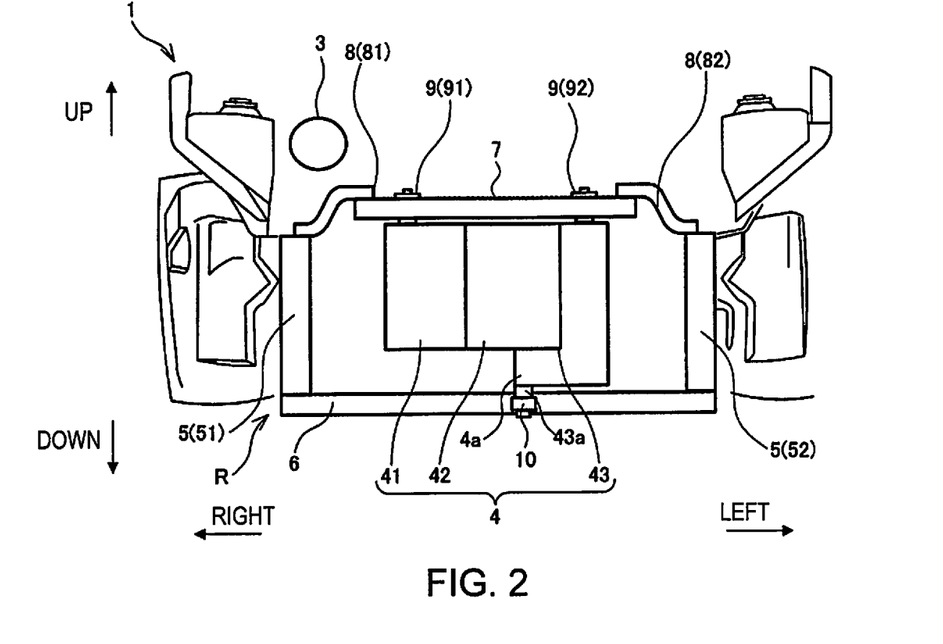
FIG. 2 is a diagram of the motor compartment interior of the electric vehicle as seen from the front of the vehicle.
Figure 3:
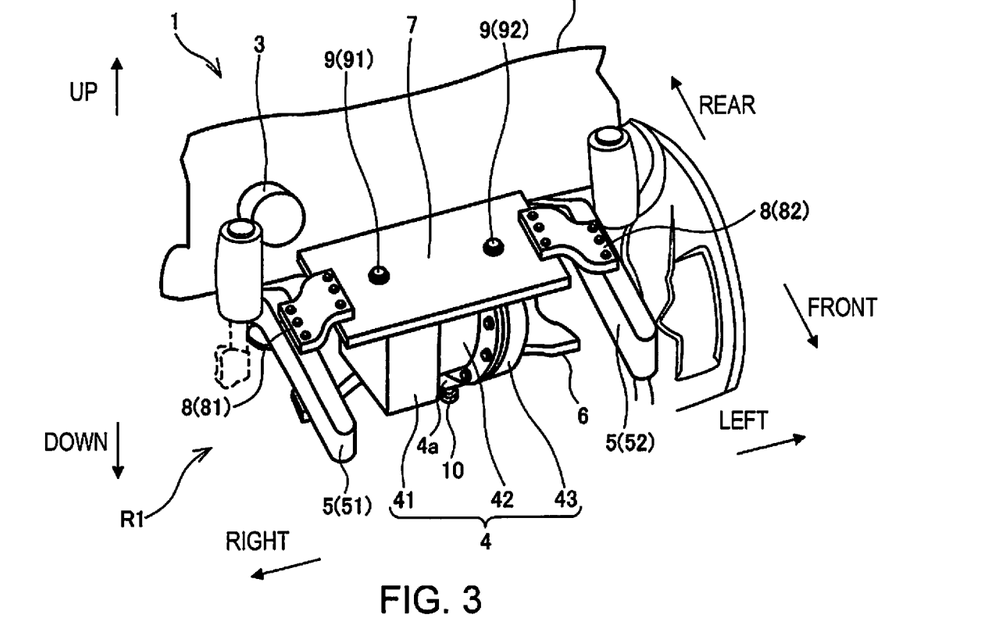
FIG. 3 is a diagram of the motor compartment interior of the electric vehicle as seen obliquely from above.
Figure 4:
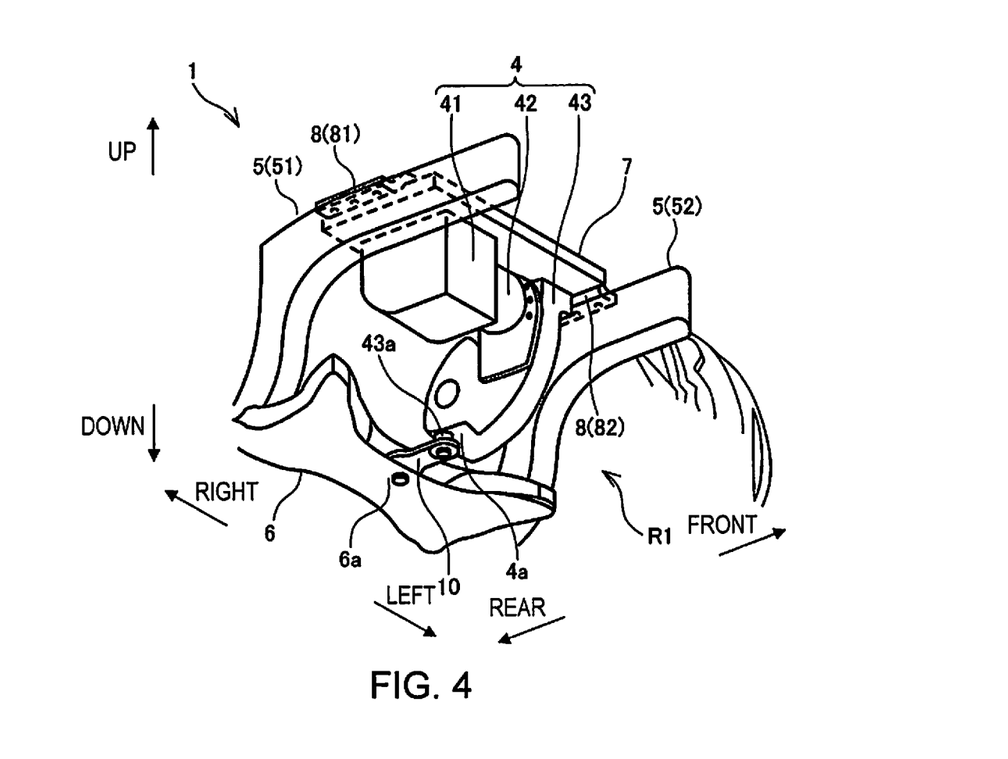
FIG. 4 is a diagram of the motor compartment interior of the electric vehicle as seen obliquely from below.
Figure 5:
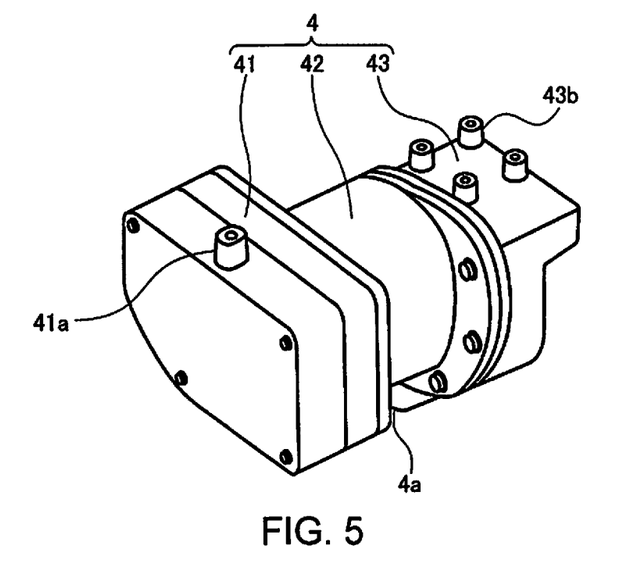
FIG. 5 is a perspective view of an electrical unit.

FIG. 1 is a diagram of the interior of a motor compartment R1 of an electric vehicle 1 as seen from above. FIG. 2 is a diagram of the interior of the motor compartment R1 of the electric vehicle 1 as seen from the front of the vehicle. FIG. 3 is a diagram of the interior of the motor compartment R1 of the electric vehicle 1 as seen obliquely from above. FIG. 4 is a diagram of the interior of the motor compartment R1 of the electric vehicle 1 as seen obliquely from below. FIG. 5 is a perspective view of an electrical unit 4.

The electric vehicle 1 is a small-sized electric vehicle, such as a small vehicle equipped with right-hand drive. The driver's seat is therefore located on the right side in the left-right direction of the vehicle. The electric vehicle 1 is equipped with a dash panel 2. The dash panel 2 separates the motor compartment R1 and a vehicle passenger compartment R2. The electric vehicle 1 is equipped with a master cylinder 3 and the electrical unit 4 in the motor compartment R1.

The master cylinder 3 converts the depression force of a brake pedal BP into brake fluid pressure. The master cylinder 3 is arranged on the motor compartment R1 side and the driver's seat side of the dash panel 2 and is connected to the brake pedal BP in the vehicle passenger compartment R2. The master cylinder 3 is located above each of side members 5, described further below. The master cylinder 3 is located directly above a first side member 51, which is one side member 5 of the side members 5. The position of the master cylinder 3 thus overlaps the first side member 51 in the left-right direction of the vehicle.

The electrical unit 4 is arranged in front of the master cylinder 3 in the front-rear direction of the vehicle and below the master cylinder 3 in the motor compartment R1. The electrical unit 4 includes an inverter 41, a motor 42, and a gearbox 43. The inverter 41 drives the motor 42, and driving force is transmitted from the motor 42 to the drive wheels via the gearbox 43, which is a reduction gear. The motor 42 can also generate electrical energy by power from the drive wheels.

The inverter 41, the motor 42, and the gearbox 43 are arranged side by side in the motor compartment R1 in the left-right direction of the vehicle. The inverter 41, the motor 42, and the gearbox 43 are arranged in that order, and the inverter 41 is arranged on the right side in the left-right direction of the vehicle.

The gearbox 43 has a structure in which the output shaft is offset with respect to the input shaft and, as shown in FIG. 4, projects farther rearward in the front-rear direction of the vehicle than the inverter 41 and the motor 42. For this reason, the distance between the electric unit 4 and configurations arranged rearward, such as the dash panel 2, becomes particularly small at the gearbox 43.

The gearbox 43 is thus positioned diagonally opposite to the master cylinder 3 in the left-right direction of the vehicle. The gearbox 43 is positioned in the left-right direction of the vehicle so as not to overlap the master cylinder 3.

The side members 5, a cross member 6, a unit member 7, and brackets 8 are provided in the motor compartment R1. The side members 5 are arranged in the motor compartment R1 on each side in the left-right direction of the vehicle and extend in the front-rear direction of the vehicle. The first side member 51 indicates the side member 5 arranged on the right side in the left-right direction of the vehicle, and a second side member 52 indicates the side member 5 arranged on the left side in the left-right direction of the vehicle. The cross member 6 is a suspension member and is connected to the vehicle body from below.

The unit member 7 is connected to the left and right side members 5. The unit member 7 is connected to the side members 5 via the brackets 8. The brackets 8 are connected to each of the side members 5 and the unit member 7 from above. A first bracket 81 indicates the bracket 8 located on the right side in the left-right direction of the vehicle, and a second bracket 82 indicates the bracket 8 arranged on the left side in the left-right direction of the vehicle. The unit member 7 is positioned below the master cylinder 3. The unit member 7 supports the electrical unit 4 via upper mounts 9.

The upper mounts 9 are arranged on each side of the unit member 7 in the left-right direction of the vehicle. The upper mounts 9 are pendulum mounts that support the electrical unit 4 in a suspended state. In other words, the electrical unit 4 is supported from above by the unit member 7 via the upper mounts 9. The upper mounts 9 have a cylindrical structure in which a rubber, etc., mounting element is integrated with a member-side bracket attached to the upper surface of the unit member 7, thereby elastically supporting the electrical unit 4. The upper mounts 9 are provided passing through the unit member 7, and the electrical unit 4 is attached to the lower end portions of the upper mounts 9.

The inverter 41 is attached to a first upper mount 91, which is the upper mount 9 on the right side in the left-right direction of the vehicle. The gearbox 43 is attached to a second upper mount 92, which is the upper mount 9 on the left side in the left-right direction of the vehicle. The first upper mount 91 is arranged farther inward of the vehicle than the master cylinder 3 in the left-right direction of the vehicle. Of the two upper mounts 9 arranged on the left and right, the first upper mount 91 corresponds to the upper mount 9 that is located on the driver's seat side.

The electrical unit 4 is also supported by a lower mount 10 at a lower rear portion 4a of the electrical unit 4. Thus, the electrical unit 4 is supported at three points by the first upper mount 91, the second upper mount 92, and the lower mount 10. The lower rear portion 4a is part of the gearbox 43 and is located below and rearward of the inverter 41 and the motor 42 in the front-rear direction of the vehicle. A boss 43a is provided on the lower rear portion 4a and bolt holes are formed in the boss 43a.

The lower mount 10 is a torque rod that has a rubber, etc., mounting element between the outer and inner cylinders at both ends. The lower mount 10 elastically supports the electrical unit 4 from below, which is mounted in a pendulum-like manner.

One end of the lower mount 10 is bolted and fixed to the boss 43a, and the other end is bolted and fixed to the cross member 6. The lower mount 10 is located between the first upper mount 91 and the second upper mount 92 in the left-right direction of the vehicle. The lower mount 10 is located on the opposite side of the first upper mount 91 along the left-right direction of the vehicle.

As shown in FIG. 5, the inverter 41 has a boss 41a, and the gearbox 43 has bosses 43b. The boss 41a is provided on the upper surface of the inverter 41, and the boss 43b is provided on the upper surface of the gearbox 43. A bolt hole is formed in the boss 41a and in each of the bosses 43b. One boss 41a is provided, and four bosses 43b are provided.

A bolt that has been inserted through the first upper mount 91 is tightened into the boss 41a. This secures the electrical unit 4 to the first upper mount 91. A unit bracket is bolted and thereby secured to the bosses 43b. The unit bracket has a tower-like structure with a raised shaft portion in the center of a base portion that is fixed at the four corners to each of the bosses 43b, and threads are formed at the end of the shaft portion. The electrical unit 4 is fixed to the second upper mount 92 by inserting the shaft portion of the unit bracket fixed to each of the bosses 43b into the second upper mount 92 and fastening a nut onto the inserted shaft portion.

In regard to the mounting elements, such as the first upper mount 91, the mounting elements include the mounts, mount attachment portions, bolts used for attaching the mounts, and attachment brackets, such as the above-described unit bracket. However, in the present embodiment, the mounts, bolts, and attachment brackets are provided with sufficient strength. Therefore, in the present embodiment, the rigidity of the mounting elements can be compared by comparing the rigidity of the mount attachment portions. That is, in the present embodiment, the mount attachment portions can be regarded as mounting elements.

Thus, in the case of the first upper mount 91, the mounting elements are the boss 41a and the first upper mount 91 attachment portion of the unit member 7. In the case of the second upper mount 92, the mounting elements are the bosses 43b and the second upper mount 92 attachment portion of the unit member 7.

The first upper mount 91 is attached to the boss 41a with a single bolt, and the second upper mount 92 is attached to each of the four bosses 43b with four bolts. The strength of the boss 41a is set lower than the total strength of the four bosses 43b. Further, the parts of the unit member 7 to which the first upper mount 91 and the second upper mount 92 are attached are similar to each other.

Therefore, in the present embodiment, the first upper mount 91, which is attached to the inverter 41, has mounting elements with lower rigidity than those of the second upper mount 92, which is attached to the gearbox 43. In other words, the second upper mount 92 has mounting elements with greater rigidity than those of the first upper mount 91. The second upper mount 92 corresponds to the upper mount 9 on the gearbox 43 side, which is located opposite the master cylinder 3 in the left-right direction of the vehicle, whereas the first upper mount 91 corresponds to the upper mount 9 on the inverter 41 side in the left-right direction of the vehicle.

In the case of the lower mount 10, the mounting elements are the boss 43a and the lower mount 10 attachment portion of the cross member 6. As shown in FIG. 4, the lower mount 10 is attached to the boss 43a with a single bolt and to an attachment portion 6a, i.e., the lower mount 10 attachment portion of the cross member 6, with a single bolt. As shown in FIG. 5, the second upper mount 92 is attached to each of the four bosses 43b with four bolts. Both the strength of the boss 43a and the strength of the attachment portion 6a are set lower than the total strength of the four bosses 43b.

Therefore, the lower mount 10 has mounting elements with lower rigidity than those of the second upper mount 92, which, of the two upper mounts 9, is the upper mount 9 with mounting elements of greater rigidity. Therefore, in the electrical unit 4 supported at three points, the second upper mount 92 is the mount whose mounting elements have the greatest rigidity.

The rigidity of the mounting elements of the first upper mount 91 is further reduced in the following manner.

Figure 6:
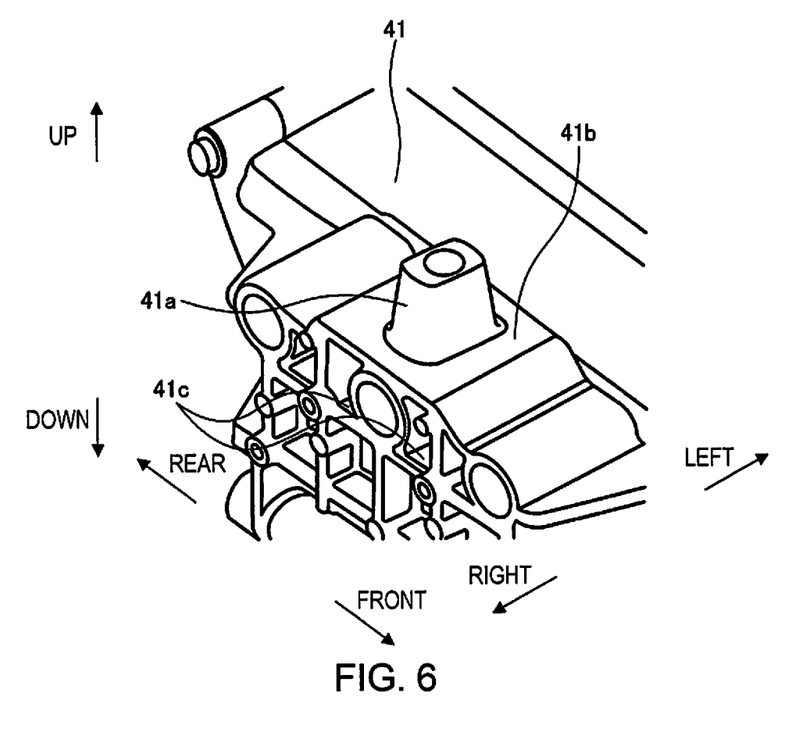
FIG. 6 is an explanatory diagram of the mounting elements of a first upper mount.

FIG. 6 is an explanatory diagram of the mounting elements of the first upper mount 91. In the inverter 41, the portion directly below the upper surface 41b on which the boss 41a is provided has a cast-molded structure. This is to ensure the planarity of the upper surface 41b, and the upper surface 41b has a two-sided structure, together with a lower surface 41c formed by casting out the portion directly below. Thus, when a collision load is applied to the electrical unit 4 at the time of a vehicle collision, the upper surface 41b is damaged, thereby preventing the exposure of the high-power electrical components in the inverter 41. Together with the boss 41a, the upper surface 41b forms the attachment portion of the first upper mount 91 and constitutes a mounting element of the first upper mount 91 in the present embodiment.

Figure 7:
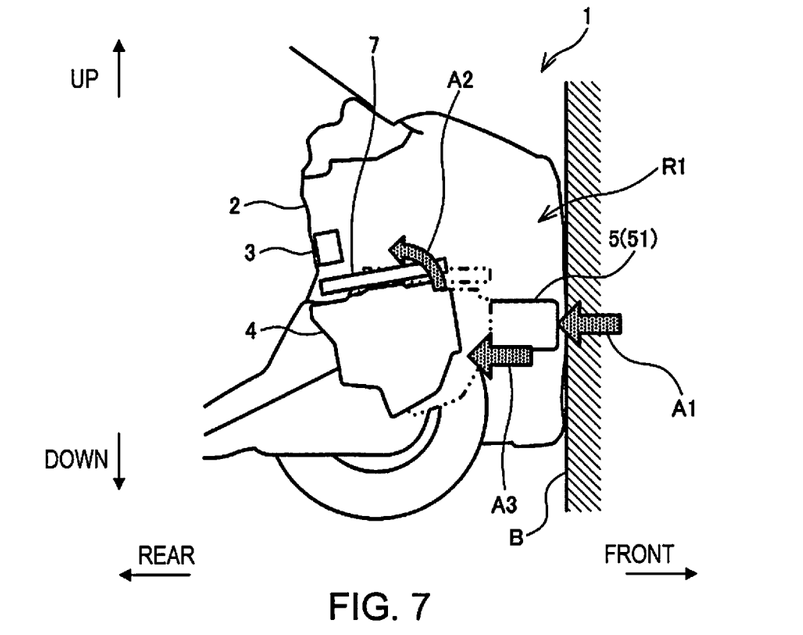
FIG. 7 is a first diagram showing the situation at the time of a vehicle collision.
Figure 8:
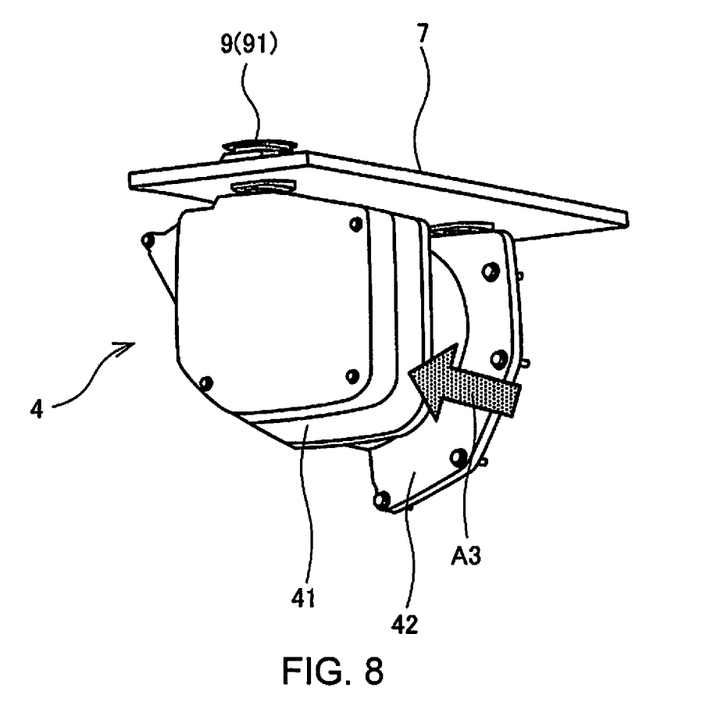
FIG. 8 is a second diagram showing the situation at the time of a vehicle collision.

The situation at the time of a collision will now be described with reference to FIGS. 7 through 9. In FIG. 7, the electrical unit 4 and the unit member 7 before vehicle collision are indicated by the double-dotted broken lines. In FIG. 8, the electrical unit 4 is shown with the gearbox 43 omitted from the illustration.

As shown in FIG. 7, when the electric vehicle 1 collides head-on with a barrier B, the barrier B crushes the side member 5 from the front, as indicated by arrow A1. The vehicle body then pitches, and the unit member 7 is lifted from the front side, as indicated by arrow A2. The barrier B then presses the lower side of the electrical unit 4, as indicated by arrow A3. At this time, as shown in FIG. 8, the collision load is applied to the motor 42 and the inverter 41 of the electrical unit 4. As described above, the rigidity of the mounting elements is lower for the first upper mount 91 than for the second upper mount 92.

Figure 9:
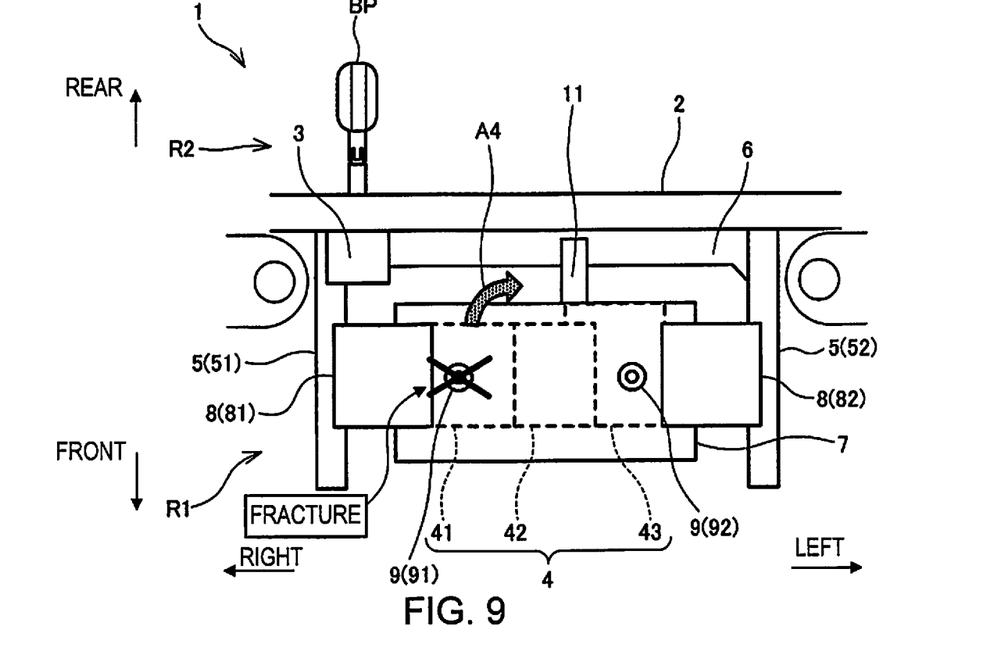
FIG. 9 is a third diagram showing the situation at the time of a vehicle collision.
Figure 10:
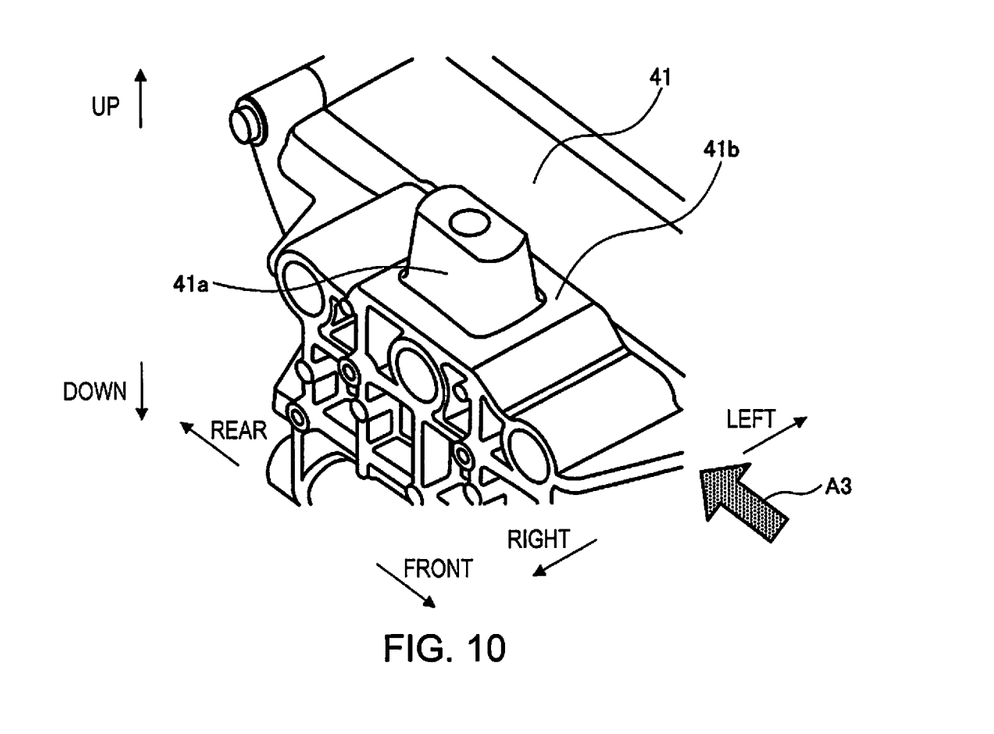
FIG. 10 is a diagram showing a first modified example of the mounting part of the first upper mount.

Therefore, when a collision load is applied to the electrical unit 4, as indicated in FIG. 9, the mounting element of the first upper mount 91 fractures first. As a result, the electrical unit 4 is pushed toward the rear, with the second upper mount 92 and one end of the lower mount 10 acting as fulcrums. Thus, the electrical unit 4 retracts while pivoting backwards, as indicated by arrow A4, as seen from above.

Therefore, the electrical unit 4 does not move straight back, rearward in the front-rear direction of the vehicle, but interferes with the dash panel 2 in the area between the driver's seat and the passenger seat. As a result, the electrical unit 4 is prevented from interfering with the master cylinder 3 and the dash panel 2 in the area in front of the occupants, thereby increasing the safety of the occupants in the event of a collision. Further, the lower mount 10 and the second upper mount 92 on the passenger seat side support the electrical unit 4 and suppress the amount of retraction of the dash panel 2 due to interference of the electrical unit 4, which also enhances occupant safety.

The main action and effects of the present embodiment will now be described.

The electric vehicle 1 is equipped with the dash panel 2, the master cylinder 3, which is located on the motor compartment R1 side and the driver's seat side of the dash panel 2 and connected to the brake pedal BP in the vehicle passenger compartment R2, and the electrical unit 4, which includes the inverter 41, the motor 42, and the gearbox 43 arranged side by side in the left-right direction of the vehicle inside the motor compartment R1. The electrical unit 4 is arranged in the motor compartment R1 in front of and below the master cylinder 3 in the front-rear direction of the vehicle.

By means of such a configuration, since the electrical unit 4 is arranged in the manner described above, even if the spacing between the dash panel 2 and the electrical unit 4 in the front-rear direction of the vehicle is narrow, the electrical unit 4 is less likely to interfere with the master cylinder 3 in the event of a vehicle collision. This makes it easier to prevent the brake pedal BP from moving backward and impacting the driver, thereby enhancing the safety of the occupants during a vehicle collision.

The electric vehicle 1 is also equipped with the unit member 7, which is connected to each of the side members 5 arranged in the motor compartment R1 on either side in the left-right direction of the vehicle, and which is located below the master cylinder 3. The electrical unit 4 is supported by the unit member 7 from above by means of the upper mounts 9 at two locations on the left and right, and by the lower mount 10 at the lower rear portion 4a of the electrical unit 4. Of the upper mounts 9, which are arranged at two locations on the left and right, one upper mount 9 has mounting elements with lower rigidity than those of the other upper mount 9.

By means of such a configuration, in the event of a vehicle collision, of the upper mounts 9, one upper mount 9 will fracture first. As a result, the electrical unit 4 will move backwards while pivoting about the other upper mount 9 and one end of the lower mount 10, and interfere with the dash panel 2 in the area between the driver's seat and the passenger seat. That is, the electrical unit 4 does not move straight back, rearward in the front-rear direction of the vehicle, but interferes with the dash panel 2 in the area behind which there is no occupant. As a result, even if the spacing between the electrical unit 4 and the dash panel 2 is narrow, the probability of the electrical unit 4 interfering with the master cylinder 3 and the area of the dash panel 2 in front of an occupant can be reduced, thereby enhancing occupant safety in the event of a collision. In addition, even if one of the upper mounts 9 fractures, the other upper mount 9 and the lower mount 10 support the electrical unit 4, so that the amount of retraction of the dash panel 2 due to interference of the electrical unit 4 is suppressed. Thus, the safety of the occupants is thereby enhanced.

The master cylinder 3 and the gearbox 43 are arranged diagonally opposite each other in the left-right direction of the vehicle. The second upper mount 92, which, of the upper mounts 9, is the upper mount 9 arranged on the gearbox 43 side, has mounting elements with greater rigidity than those of the first upper mount 91, which is the upper mount 9 arranged on the inverter 41 side.

By means of such a configuration, the master cylinder 3 and the gearbox 43 are arranged diagonally opposite each other, so that even if the gearbox 43 projects rearward in the front-rear direction of the vehicle, the electrical unit 4 is less likely to interfere with the master cylinder 3 at the time of a vehicle collision. Moreover, since the second upper mount 92 has mounting elements with greater rigidity than those of the first upper mount 91, the gearbox 43 is less likely to be pushed rearward at the time of a vehicle collision, and is thus less likely to interfere with the dash panel 2.

The gearbox 43 is positioned in the left-right direction of the vehicle so as not to overlap the master cylinder 3. This configuration makes it easier to prevent interference between the master cylinder 3 and the gearbox 43, even if the electrical unit 4 were to move straight back, rearward in the front-rear direction of the vehicle, at the time of a collision.

The master cylinder 3 is located directly above a first side member 51, which, of the side members 5, is one side member 5. The first upper mount 91, which, of the upper mounts 9, is the upper mount 9 arranged on the driver's seat side, is arranged farther inward of the vehicle than the master cylinder 3 in the left-right direction of the vehicle.

By means of this configuration, the master cylinder 3 is arranged to have positional overlap with the first side member 51 in the left-right direction of the vehicle, but no positional overlap with the first upper mount 91. Thus, a configuration that makes it easier to avoid interference between the master cylinder 3 and the electrical unit 4 can be obtained.

The lower mount 10 has mounting elements with lower rigidity than those of the second upper mount 92, which, of the upper mounts 9, is the upper mount 9 that has mounting elements of greater rigidity. By means of this configuration, at the time of a vehicle collision, the second upper mount 92 is the last remaining component and acts as a fulcrum for pivoting the electrical unit 4 about the second upper mount 92, thereby moving the electrical unit 4 rearwards while the lower portion of the electrical unit 4 is flipped up. As a result, the electrical unit 4 will not move straight back, rearward in the front-rear direction of the vehicle, so that it becomes easier to prevent the electrical unit 4 from interfering with the area of the dash panel 2 in front of an occupant or the master cylinder 3 at the time of a collision.

The rigidity of the mounting elements of the first upper mount 91 may be further reduced in the following manner.

FIGS. 10 to 13 are diagrams showing modified examples of the mounting elements of the first upper mount 91. In the first modified example shown in FIG. 10, the boss 41a is made narrower in the left-right direction of the vehicle than in the front-rear direction of the vehicle. As a result, compared to the other way round, the width of the boss 41a is narrower in the direction in which a collision load is applied, as indicated by arrow A3. This makes it easier for stress to be concentrated on the boss 41a and thereby to fracture the upper surface 41b from the base portion of the boss 41a on the front side of the vehicle.

Figure 11:
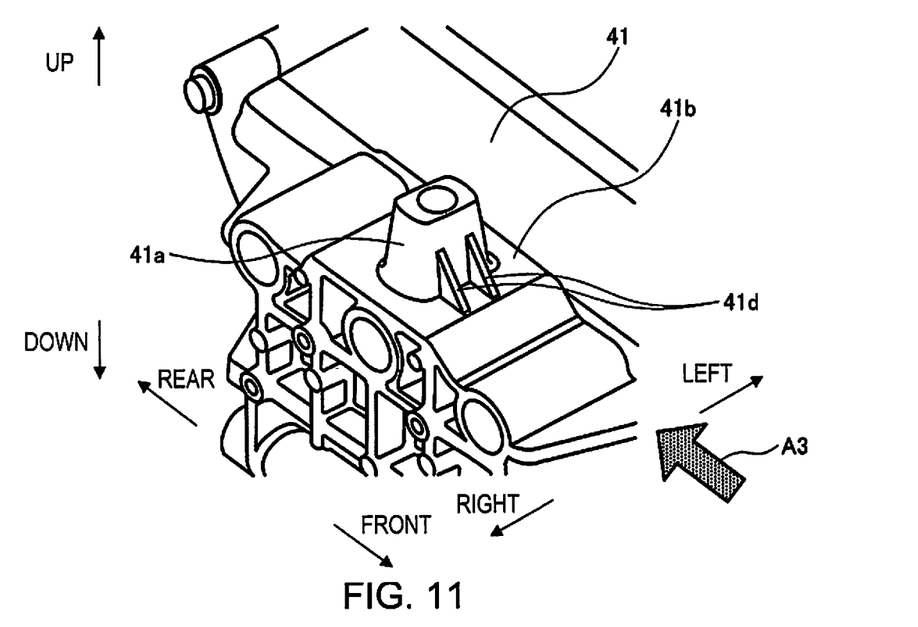
FIG. 11 is a diagram showing a second modified example of the mounting part of the first upper mount.

In the second modified example shown in FIG. 11, ribs 41d are provided that connect the wall of the boss 41a on the front side of the vehicle to the upper surface 41b. In this case, when the electrical unit 4 is subjected to a collision load, it will be easier for stress to become concentrated on the ribs 41d and thereby fracture the upper surface 41b from the base portion of the boss 41a on the front side of the vehicle.

Figure 12:
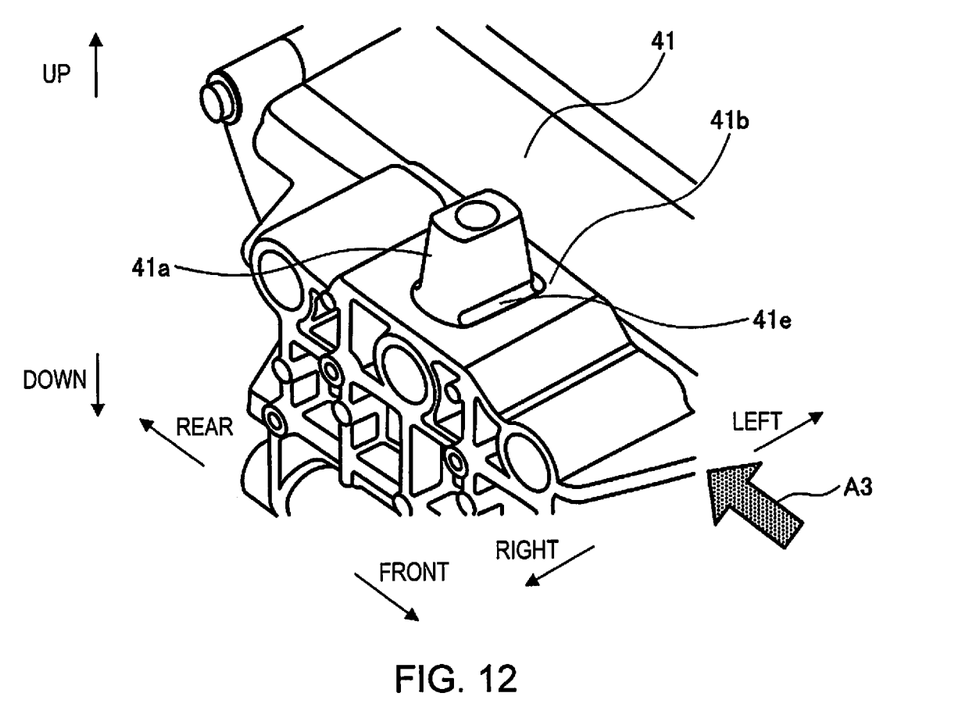
FIG. 12 is a diagram showing a third modified example of the mounting part of the first upper mount.

In the third modified example shown in FIG. 12, a groove 41e extending in the left-right direction of the vehicle is provided at the base of the boss 41a on the front side of the vehicle. In this example, it will be easier for stress to become concentrated in the groove 41e and thereby fracture the upper surface 41b from the base portion of the boss 41a on the front side of the vehicle.

Figure 13:
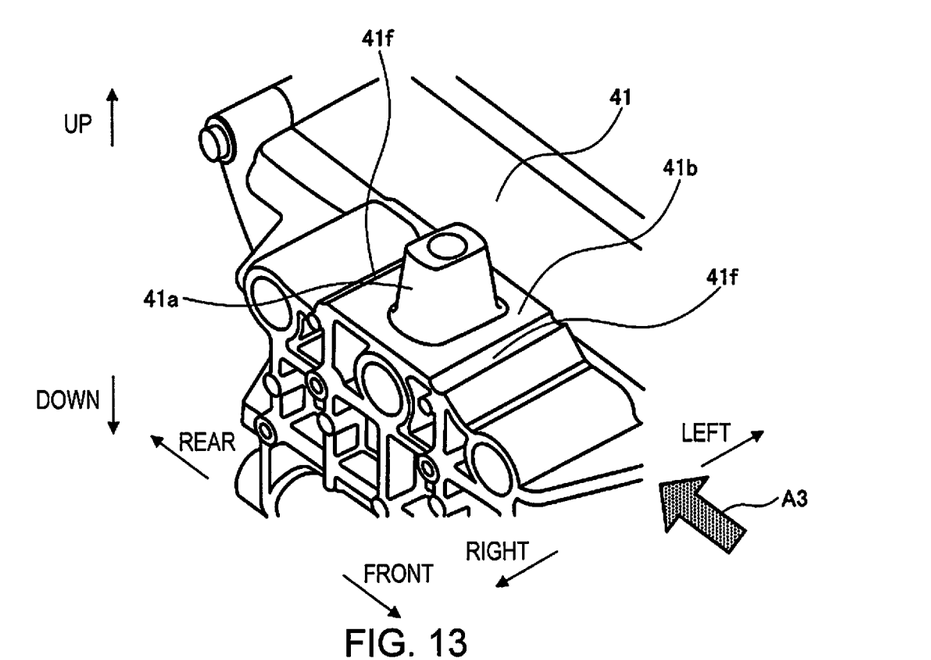
FIG. 13 is a diagram showing a fourth modified example of the mounting part of the first upper mount.

In the fourth modified example shown in FIG. 13, grooves 41f extending in the left-right direction of the vehicle are respectively provided at both ends of the upper surface 41b in the front-rear direction of the vehicle. In this example, it will be easier for stress to become concentrated in each of the two grooves 41f and thereby fracture the entire upper surface 41b between the two grooves 41f.

Embodiments of the present invention were described above, but the above-described embodiments illustrate only some of the application examples of the present invention and are not intended to limit the technical scope of the present invention to the specific configurations of the above-described embodiments.

Figure 14:
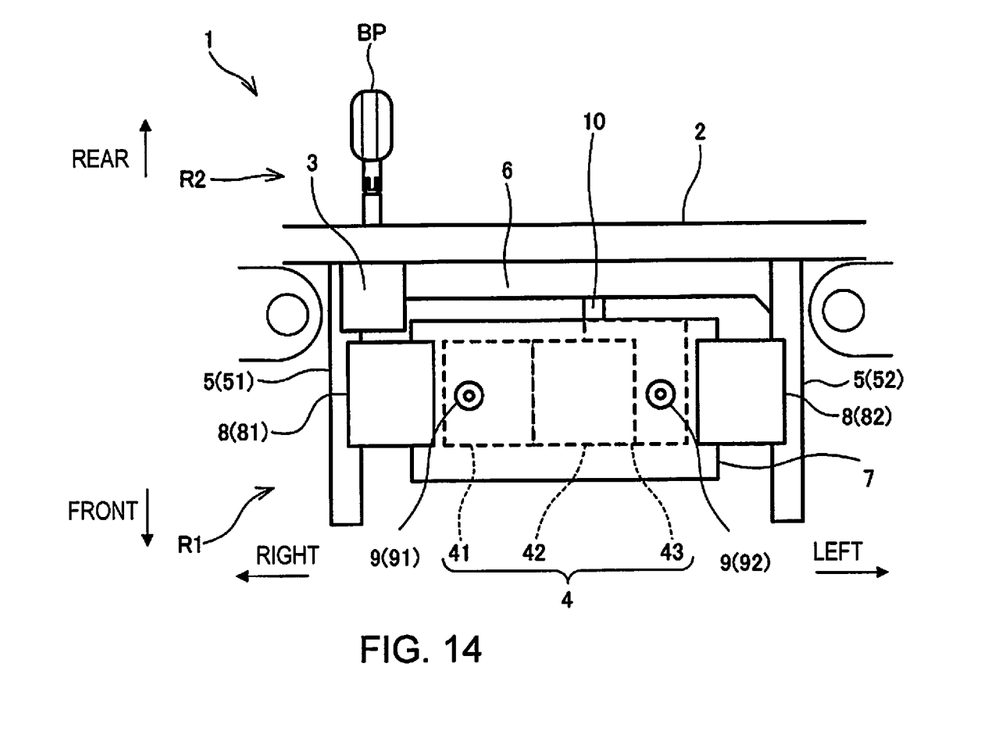
FIG. 14 is a diagram showing a first modified example of the electric vehicle.

For example, as shown in FIG. 14, the electrical unit 4 may be positioned below the master cylinder 3 so as to partially overlap the master cylinder 3 in the front-rear position. In this example, the gearbox 43 has positional overlap with the master cylinder 3 in the front-rear direction. Even in this case, the electrical unit 4 is less likely to interfere with the master cylinder 3 in the event of a vehicle collision, thereby enhancing occupant safety.

Figure 15:
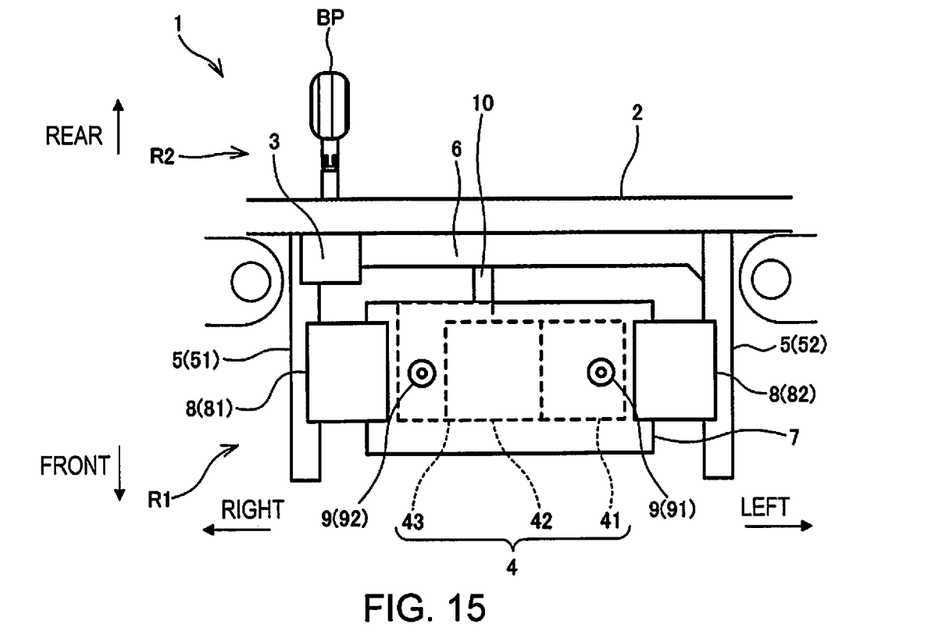
FIG. 15 is a diagram showing a second modified example of the electric vehicle.

As shown in FIG. 15, the master cylinder 3 and the gear box 43 may be arranged on the same side in the left-right direction of the vehicle. In this case, the second upper mount 92, which, of the upper mounts 9, is the upper mount 9 arranged on the gearbox 43 side, is configured to have mounting elements with greater rigidity than those of the first upper mount 91, which is the upper mount 9 arranged on the inverter 41 side. In this case, by making it difficult for the electrical unit 4 to move backward, toward the master cylinder 3 side, at the time of a vehicle collision, it is possible to make it difficult for the master cylinder 3 and the electrical unit 4 interfere with each other and thereby suppress the amount of retraction of the master cylinder 3.

Figure 16:
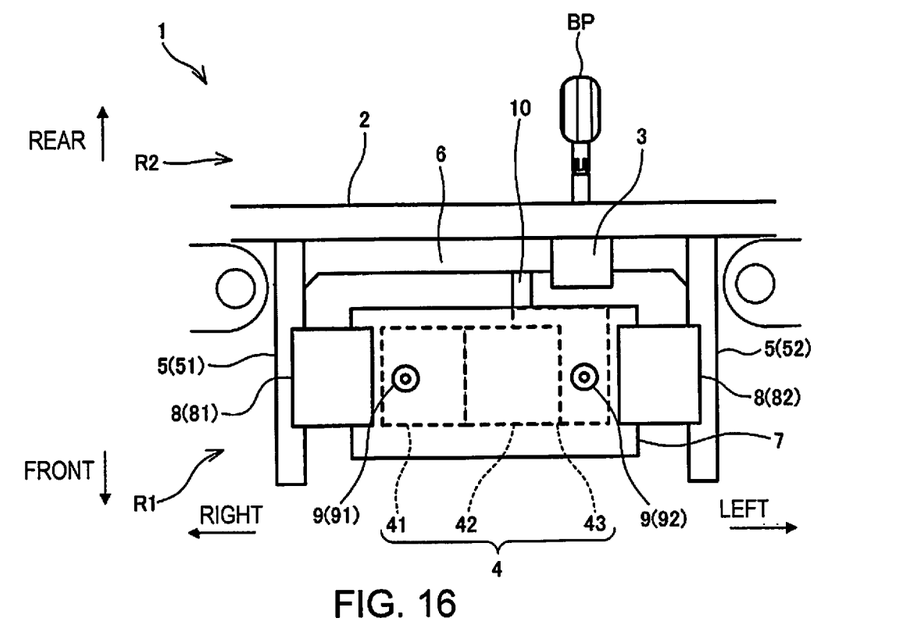
FIG. 16 is a diagram showing a third modified example of the electric vehicle.

This configuration is also effective when the electric vehicle 1 is a left-hand drive vehicle. This is because, as shown in FIG. 16, when the electric vehicle 1 is a left-hand drive vehicle, the master cylinder 3 is arranged on the left side in the left-right direction of the vehicle, and the master cylinder 3 and the electrical unit 4 overlap in the left-right direction of the vehicle. In this case, the first upper mount 91 is arranged on the right side in the left-right direction of the vehicle, and the second upper mount 92 is arranged on the left side in the left-right direction of the vehicle.

On the other hand, in the example shown in FIG. 15, the gearbox 43 may be arranged so that its position in the left-right direction of the vehicle does not overlap the master cylinder 3, thereby making it easier to prevent interference between the master cylinder 3 and the gearbox 43. Further, in the example shown in FIG. 15, the master cylinder 3 may be positioned directly above the first side member 51, and the second upper mount 92, which is located on the driver's seat side, may be arranged farther inward of the vehicle than the master cylinder 3 in the left-right direction of the vehicle, which makes it possible to obtain a configuration that easily avoids interference between the master cylinder 3 and the electrical unit 4.

In the embodiments described above, the case in which the electric vehicle 1 is a small-sized electric vehicle was described, such as a small vehicle. However, increasing occupant safety in the manner described in the above embodiments is also effective irrespective of the vehicle class, such as in the case in which the required motor power of the electric vehicle 1 is increased and the size of the electrical unit 4 is correspondingly larger, thereby increasing the proportion of the motor compartment R1 occupied by the electrical unit 4.

The invention claimed is:

1. An electric vehicle comprising:
   a dash panel;
   a master cylinder disposed on a motor compartment side and a driver's seat side of the dash panel, and connected to a brake pedal disposed in a vehicle passenger compartment interior; and
   an electrical unit including an inverter, a motor, and a gearbox that are arranged side by side in a left-right direction of the vehicle in the motor compartment; and
   a unit member positioned below the master cylinder and connected to each of a pair of side members arranged on both sides of the vehicle in the left-right direction in the motor compartment,
   the electrical unit being located in the motor compartment in front of and below the master cylinder in a front-rear direction of the vehicle, or below the master cylinder so as to partially overlap with the master cylinder in the front-rear direction.

2. The electric vehicle according to claim 1, wherein the electrical unit is supported by the unit member from above by upper mounts at two locations on the left and right, and supported by a lower mount at a lower rear portion of the electrical unit, and
   one of the upper mounts is arranged at the two locations on the left and right has a mounting element with a lower rigidity than a mounting element of the other of the upper mounts.

3. The electric vehicle according to claim 2, wherein the master cylinder and the gearbox are arranged diagonally opposite each other in the left-right direction of the vehicle, and
   the mounting element of the upper mount of the upper mounts that is arranged on a gearbox side has a greater rigidity than the mounting element of the upper mount of the upper mounts that is arranged on an inverter side.

4. The electric vehicle according to claim 2, wherein the master cylinder and the gearbox are arranged on the same side in the left-right direction of the vehicle, and
   the mounting element of the upper mount of the upper mounts that is arranged on a gearbox side has a greater rigidity than the mounting element of the upper mount of the upper mounts that is arranged on an inverter side.

5. The electric vehicle according to claim 3, wherein the gearbox is positioned in the left-right direction of the vehicle so as not to overlap the master cylinder.

6. The electric vehicle according to claim 5, wherein the master cylinder is positioned directly above one of the side members, and
   the upper mount located on the driver's seat side of the upper mounts is arranged farther inward of the vehicle than the master cylinder in the left-right direction of the vehicle.

7. The electric vehicle according to claim 2, wherein the lower mount has a mounting element with a lower rigidity than the mounting element of the upper mount of the upper mounts having the greater rigidity.

\* \* \* \* \*